United States Patent
Linet et al.

(10) Patent No.: US 7,758,302 B2
(45) Date of Patent: Jul. 20, 2010

(54) DEVICE FOR THE OFFTAKE OF MECHANICAL POWER BETWEEN THE HP AND LP SHAFTS OF A DOUBLE-SHAFT TURBINE ENGINE

(75) Inventors: Hugues Henri Raymond Linet, Asnieres sur Seine (FR); Cyril Franck Mouchnino, Paris (FR); Serge Dominique Pettinotti, Courbevoie (FR)

(73) Assignee: Hispano-Suiza, Colombes (FR)

( * ) Notice: Subject to any disclaimer, the term of this patent is extended or adjusted under 35 U.S.C. 154(b) by 910 days.

(21) Appl. No.: 11/551,494

(22) Filed: Oct. 20, 2006

(65) Prior Publication Data

US 2007/0137219 A1 Jun. 21, 2007

(30) Foreign Application Priority Data

Oct. 21, 2005 (FR) .................................. 05 53212

(51) Int. Cl.
*F01D 13/00* (2006.01)
(52) U.S. Cl. ....................................... 415/68; 415/124.1
(58) Field of Classification Search ............... 415/65, 415/68, 122.1, 123, 124.1; 416/124, 126; 74/665 GC, 665 GB, 665 T; 60/792, 39.162, 60/802, 39.163
See application file for complete search history.

(56) References Cited

U.S. PATENT DOCUMENTS

| 2,485,126 | A | * | 10/1949 | Wood | 415/26 |
|---|---|---|---|---|---|
| 2,895,349 | A | * | 7/1959 | Wehsely | 74/745 |
| 3,038,307 | A | * | 6/1962 | Oprecht | 60/792 |
| 3,626,692 | A | | 12/1971 | Kumm | |
| 4,776,163 | A | | 10/1988 | Brockmann | |
| 6,467,725 | B1 | * | 10/2002 | Coles et al. | 244/58 |
| 6,672,049 | B2 | * | 1/2004 | Franchet et al. | 60/226.1 |
| 7,552,582 | B2 | * | 6/2009 | Eick et al. | 60/39.163 |
| 2005/0183423 | A1 | * | 8/2005 | Miller | 60/802 |
| 2006/0034693 | A1 | | 2/2006 | Lardellier | |
| 2006/0260323 | A1 | * | 11/2006 | Moulebhar | 60/793 |
| 2006/0277920 | A1 | * | 12/2006 | Bart et al. | 60/793 |

FOREIGN PATENT DOCUMENTS

FR 2 863 312 6/2005

OTHER PUBLICATIONS

U.S. Appl. No. 11/608,528, filed Dec. 8, 2006, Linet, et al.

* cited by examiner

*Primary Examiner*—Edward Look
*Assistant Examiner*—Aaron R Eastman
(74) *Attorney, Agent, or Firm*—Oblon, Spivak, McClelland, Maier & Neustadt, L.L.P.

(57) ABSTRACT

A device for driving auxiliary machines of a double-shaft turbine engine with an LP shaft and an HP shaft is disclosed. The machines are installed in an accessory gearbox which includes a common drive shaft. The device includes a differential gear with a first input shaft and a second input shaft and an output shaft. The first shaft being connected via a selective coupling either to the LP shaft or to the HP shaft, the second input shaft is connected to the HP shaft, and the output shaft being connected to the drive shaft of the gearbox.

8 Claims, 1 Drawing Sheet

DEVICE FOR THE OFFTAKE OF MECHANICAL POWER BETWEEN THE HP AND LP SHAFTS OF A DOUBLE-SHAFT TURBINE ENGINE

The present invention relates to the field of multi-shaft gas turbine engines, applied in aviation, and is aimed at a means of offtaking mechanical power from the rotor shafts. The particular purpose of this means is the driving of the auxiliary machines.

A turbine engine comprises, in a general manner, an air compressor at least partly supplying a combustion chamber. The gases originating from the latter drive one or more turbine stages mechanically connected to the compressors, and at least partly supply the thrust. A double-shaft engine comprises two sets of rotors, having concentric shafts and rotating mechanically free relative to one another. There is the low pressure shaft, called LP, and the high pressure shaft, called HP. Civilian turbojets or turboprops comprise a fan or propeller rotor driven by the LP shaft and delivering a large proportion of the thrust of the engine.

A part of the power supplied by the engine is used to supply the auxiliary machines of both the engine itself and of the aircraft of which it provides the propulsion.

This power is currently taken off, partly mechanically, from the shaft of the HP stage of the engine to drive a power-receiving shaft of an accessory gearbox. This gearbox is also called the AGB. In a turbojet with a front fan, this gearbox is placed on the casing of the latter. Its receiving shaft is usually driven by a transmission shaft housed in one of the structural arms of the casing, and connected through an angle transmission gearbox to a movement-offtake pinion fixedly attached to the HP shaft. Various auxiliary machines, such as generators and hydraulic oil or fuel pumps are installed and driven on this gearbox. Another portion of the offtake consists of the pressurized air, bled off from the HP compressor to provide in particular the pressurization and air conditioning of the aircraft cabin or the de-icing.

The current trend is aimed at increasing the proportion of the mechanical power offtake due to the increasing proportion of the electrical means, considered more flexible to use. This increasing demand for electrical supply for the equipment of the aircraft no longer makes it possible, for reasons of engine operation and performance, mainly at low rotation speeds, to take off the power from the HP shaft only.

This increase in power offtake for the new applications of turbine engines therefore requires the application of a system for taking off mechanical power from the HP and LP bodies. The subject of the invention is therefore a means of taking off power from the two rotors.

However, the HP and LP bodies rotate independently at different speeds and have different operating ranges. Between the idling speed and the full gas speed, the speed ratio for the HP shaft is of the order of two; the rotation speed increases for example from 10 000 revolutions per minute to 20 000 revolutions per minute. On the other hand, the speed ratio for the LP shaft is of the order of five; its speed increases for example from 900 revolutions per minute at idling to 4500 revolutions per minute at full gas speed. The problem therefore arises of providing an offtake compatible with these two distinct operating ranges. This problem is all the more important to solve because the accessories installed on the gearbox are suitable for operating within speed ranges compatible with that of the HP shaft. It has been seen that it is clearly higher than that of the LP shaft.

The present invention therefore also has as its subject a means of taking off mechanical power that is suited to the operating range of the accessories mounted on the AGB.

These objectives, according to the invention, are achieved with a device for driving auxiliary machines of a multi-shaft turbine engine, particularly a double-shaft turbine engine, with an LP shaft and an HP shaft, the said machines being installed in an accessory gearbox comprising a common drive shaft, characterized in that it comprises a differential gear with a first input shaft and a second input shaft and an output shaft, the first input shaft being connected via a selective coupling either to the LP shaft or to the HP shaft,
the second input shaft being connected to the HP shaft, and
the output shaft being connected to the drive shaft of the said gearbox.

More particularly, the first shaft is connected via the selective coupling to the LP shaft when the engine speed is less than a determined value and to the HP shaft when the speed is greater than the said value.

Preferably, the selective coupling is of the dog clutch type.

The solution of the invention therefore allows an offtake of mechanical power from the LP shaft that is sufficient to maintain the performance of the engine and maintain the rotation of the accessory gearbox drive in a range of speeds compatible with the machines installed thereon.

The patents FR 2.520.806 and FR 2.606.077 are known which each relate to a two-shaft engine and a movement offtake in which the latter comprises a differential mechanism connected to each of the two shafts and provided with an output shaft rotating at a speed that is a function of the difference of the speeds of the two shafts. The range of variation of the difference of the speeds being smaller than that of the shafts, the need to adapt the machines is reduced. However, it cannot be eliminated entirely.

A non-limiting embodiment of the invention is described in greater detail, hereinafter represented in the appended drawings in which.

The turbine engine is not shown because the invention does not relate to it. It may be any engine. It is however necessarily a multi-shaft turbine engine, particularly a double-shaft turbine engine, as referred to hereinabove. The shafts 1 and 3, LP and HP, are concentric, mechanically free to rotate relative to one another. They are either co-rotational, or contra-rotational. The LP shaft is mounted via appropriate bearings inside the HP shaft. In the case of a dual flow turbojet, it drives a fan, for example placed at the front.

Each of the two shafts is provided with a means of rotary movement offtake represented here by two bevel gears, 1a and 3a respectively.

Figure 1:
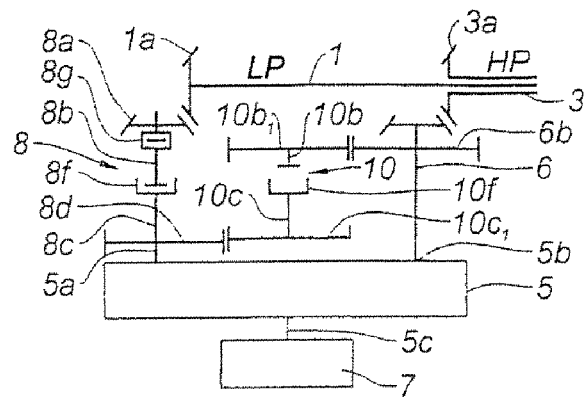
FIG. 1 is a schematic representation of a mechanical power offtake according to the invention in a multi-offtake configuration.

A differential 5 with an epicyclic gear set comprises a first input shaft 5a and a second input shaft 5b, and a power output 5c connected to the common drive shaft of an accessory gearbox 7. In FIG. 1, this shaft is indistinguishable from the power output shaft 5c of the differential 5.

The kinetic transmission 8 between the bevel gear 1a and the input of the differential 5 here consists of a bevel gear 8a engaged with the bevel gear 1a and a movement transmission line 8b-8c. This movement transmission line comprises a disengageable coupling means 8f, such as a dog clutch, between two elements, one 8b connected to the bevel gear 8a and the other 8c connected to the input 5a of the differential 5.

A free wheel 8g is interposed upstream of the dog clutch 8f, that is to say between the pinion 8a and the movement transmission line 8b for example. This free wheel 8f is arranged so as to be engaged when the accessory gearbox 7 operates as a receiver, that is to say when the engine is operating. The free wheel is disengaged, that is to say that it transmits no rotary movement between the movement transmission line 8b and the bevel gear 8a when the gearbox 7 is driving, that is to say on start-up when the starter is actuated in order to drive the HP rotor. The description of the operation on startup is presented later.

The transmission 6 between the bevel gear 3a and the input 5b of the differential is direct, with no disengageable coupling.

A disengageable coupling 10f is provided between the two transmissions 6 and 8. It is mounted on a shaft 10 in two parts 10b and 10c on either side of the coupling. The part 10b is connected via gears 10b1, 6b to the transmission 6 and the part 10c is connected via gears 10c1, 8d to the part 8c of the shaft 8. The coupling is for example a dog clutch coupling.

The two couplings 8f and 10f, forming a selective coupling, are controlled by an appropriate control member.

In the configuration of FIG. 1, the dog clutch coupling 8f is engaged. The parts 8b and 8c are fixedly attached together; the two parts 10b and 10c are separated from one another. The LP shaft drives the input shaft 5a of the differential 5 and the HP shaft drives the input shaft 5b of the differential 5.

Figure 2:
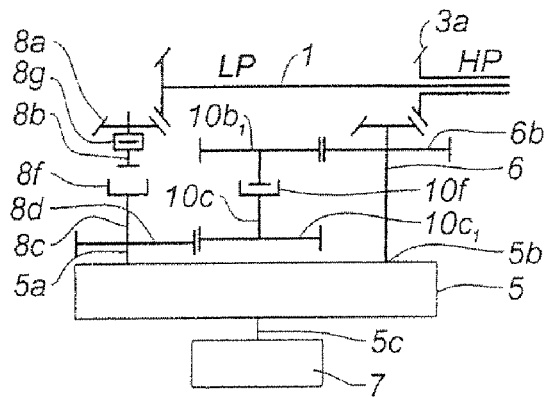
FIG. 2 is a representation of the mechanical power offtake in an HP-offtake configuration only.

FIG. 2 shows the same transmission as in FIG. 1, but it is the coupling 10f that is engaged. The parts 10b and 10c are fixedly attached together. The parts 8b and 8c are separated from one another. In this configuration, the two inputs 5a and 5b of the differential 5 are engaged with the HP shaft and driven by it. The latter alone assumes the load of driving the auxiliary machines mounted on the gearbox.

Figure 3:
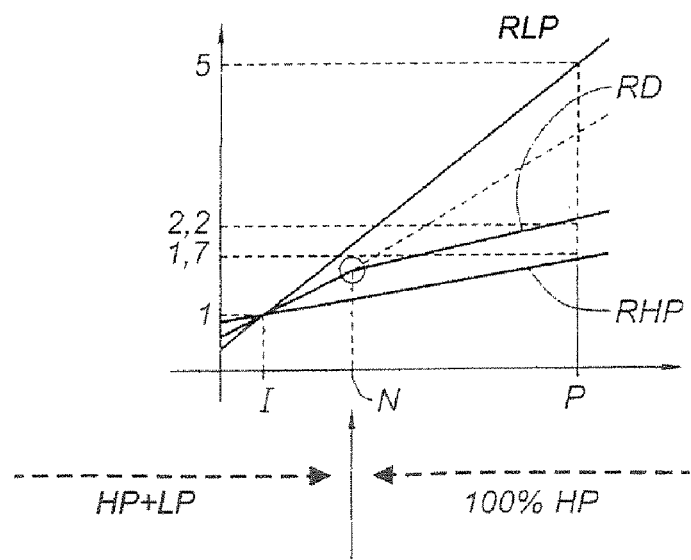
FIG. 3 is a graph illustrating the evolution of the rotation speeds of each of the shafts, as a function of the engine speed and showing the value of the invention.

The operation of the device is described with reference to FIG. 3.

This figure shows in an indicator with, on the abscissa, the engine speed or its power level. I marks the idling speed, and P the full gas speed, of takeoff for example. On the ordinate is marked the rotation speed expressed as a ratio on the idling speed.

The curve RHP extends from I to P with a value 1, corresponding to the idling speed, up to a value, here 1.7. The operating speed range of the HP rotor of this engine is from 1 to 1.7 between idling speed and full gas. The curve RBP in the same manner represents the operating speed range of the low pressure rotor LP. The speed range of the LP rotor is much more extensive than that of the HP rotor since it goes from 1 to 5.

The straight line RD shows the operating speed range of the shaft 5c.

Between the idling speed and a pre-established engine speed N, the coupling 8f is engaged; 10f is uncoupled. The configuration is in multiple offtake. The LP shaft participates in the driving of the auxiliaries and that is desirable because the HP rotor speed is not optimal for carrying out a power offtake.

The member for controlling the couplings 8f and 10f is determined in order to switch the coupling between the parts of the shafts 8 and 10, from 8f to 10f. In this configuration, the two inputs 5a and 5b are driven by the same shaft, HP. The evolution curve of the speed of the output of the differential 5c is parallel to the curve RHP. In this example, the speed of the input shaft of the gearbox therefore evolves in a limited range, from 1 to 2.2, the speed range being controlled uniquely by the HP shaft. The requirements of the machines installed on the gearbox are thus satisfied.

It is understood that, if the selective coupling remained positioned on the dog clutching of 8f, the speed would evolve like the curve in dashed lines from the speed N. The speed ratio would then be scarcely less than that of RBP.

The second configuration corresponding to that of FIG. 2, is used for the engine rotation speeds allowing the offtake of power from the HP shaft only.

For the start-up of the engine, a starter, not shown, is connected to the gearbox 7. The configuration, not shown, differs from those represented in FIGS. 1 and 2. In this case, the selective coupling is placed so that the two dog clutches 8f and 10f are engaged at the same time; the two transmission lines 8b-8c, on the one hand, and 10b-10c, on the other hand, are coupled. Because of the transmission of power from the gearbox 7 to the pinion 8a, the free wheel 8g is disengaged. As in the configuration of FIG. 2, the motive power of the starter is transmitted in full to the HP rotor. At the end of start-up, the control releases the dog clutch 10f in order to decouple the shafts 10b and 10c from one another. Turn to configuration 1. After start-up, the gearbox 7 becoming the receiver, the free wheel is then automatically engaged and there is idling speed in the configuration of FIG. 1.

The free wheel 8g thus makes it possible, at start-up, to avoid having to accelerate up to the pre-established point of speed N for the change of configuration, this speed being able to be too high and creating an excessive thrust on the ground.

The invention claimed is:

1. A device for driving auxiliary machines of a double-shaft turbine engine with an LP shaft and an HP shaft, the machines being installed in an accessory gearbox comprising a common drive shaft, the device comprising:
    a differential gear with a first input shaft and a second input shaft and an output shaft, the first input shaft being connected via a selective coupling either to the LP shaft or to the HP shaft, the second input shaft being connected to the HP shaft, and the output shaft being connected to the drive shaft of the gearbox,
    wherein the selective coupling includes a first coupling disposed between the first input shaft and the LP shaft, and
    wherein a free wheel device disposed in a mechanical transmission line between the first coupling and the LP shaft is engaged when the engine is operating and disengaged when the engine is driven on start-up by the shaft of the accessory gearbox.

2. The device according to claim 1, wherein the first shaft is connected via the selective coupling to the LP shaft when the engine speed is less than a determined value (N) and to the HP shaft when the speed is greater than the determined value.

3. The device according to claim 1, wherein the first coupling is a dog clutch.

4. The device according to claim 3, wherein the selective coupling further comprises a a second coupling disposed between the first input shaft and the HP shaft.

5. The device according to claim 4, wherein the second coupling is a dog clutch.

6. A device for driving auxiliary machines of a double-shaft turbine engine with an LP shaft and an HP shaft, the machines being installed in an accessory gearbox comprising a common drive shaft, the device comprising:
    a differential gear with a first input shaft and a second input shaft and an output shaft, the first input shaft being connected via a selective coupling either to the LP shaft or to the HP shaft, the second input shaft being connected to the HP shaft, and the output shaft being connected to the drive shaft of the gearbox, wherein the selective coupling is a dog clutch, wherein the dog clutch selective coupling comprises a first dog clutch between the first input shaft and the LP shaft and a second dog clutch between the first input shaft and the HP shaft, and wherein a free wheel device in a mechanical transmission line between the first dog clutch and the LP shaft is arranged so as to be engaged when the engine is operating and disengaged when the engine is driven on start-up by the shaft of the accessory gearbox.

7. The device according to claim 5, wherein the first coupling and the second coupling are engaged when the engine is driven on start-up.

8. The device according to claim 5, wherein a first gear is disposed on a first side of the second coupling and a second gear is disposed on a second side of the second coupling, and wherein the first gear engages a third gear disposed on the first input shaft and the second gear engages a fourth gear disposed on the second input shaft.

* * * * *